United States Patent
Radermacher et al.

(10) Patent No.: US 8,067,898 B2
(45) Date of Patent: Nov. 29, 2011

(54) POWER SUPPLY DEVICE FOR LIGHT ELEMENTS AND METHOD FOR SUPPLYING POWER TO LIGHT ELEMENTS

(75) Inventors: Harald Josef Gunther Radermacher, Stolberg (DE); Volkmar Schulz, Wurselen (DE); Matthias Wendt, Wurselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 345 days.

(21) Appl. No.: 12/443,852

(22) PCT Filed: Sep. 20, 2007

(86) PCT No.: PCT/IB2007/053822
§ 371 (c)(1),
(2), (4) Date: Apr. 1, 2009

(87) PCT Pub. No.: WO2008/041153
PCT Pub. Date: Apr. 10, 2008

(65) Prior Publication Data
US 2010/0026191 A1    Feb. 4, 2010

(30) Foreign Application Priority Data
Oct. 6, 2006   (EP) ..................................... 06121866

(51) Int. Cl.
*H05B 37/02* (2006.01)
(52) U.S. Cl. ..................... 315/291; 315/185 R; 315/307; 315/312

(58) Field of Classification Search .................. 315/291, 315/307, 209 R, 312, 224, 185 R, 192
See application file for complete search history.

(56) References Cited

U.S. PATENT DOCUMENTS

| | | | |
|---|---|---|---|
| 5,959,413 A * | 9/1999 | Komarek et al. ............. | 315/306 |
| 6,369,525 B1 | 4/2002 | Chang et al. | |
| 7,339,323 B2 * | 3/2008 | Bucur ........................... | 315/128 |
| 7,605,809 B2 * | 10/2009 | Wey et al. ..................... | 345/212 |
| 2003/0112229 A1 | 6/2003 | Pong et al. | |
| 2004/0155608 A1 | 8/2004 | Trinschek et al. | |
| 2004/0183475 A1 | 9/2004 | Boulouednine et al. | |
| 2005/0002188 A1 | 1/2005 | Bucher et al. | |
| 2005/0280375 A1 | 12/2005 | Chikugawa et al. | |
| 2006/0202915 A1 | 9/2006 | Chikugawa | |
| 2007/0013321 A1 * | 1/2007 | Ito et al. ........................ | 315/247 |

FOREIGN PATENT DOCUMENTS
EP          1320284 A2     6/2003
* cited by examiner

*Primary Examiner* — David Hung Vu
(74) *Attorney, Agent, or Firm* — Mark L. Beloborodov

(57) ABSTRACT

Disclosed is a power supply device for light elements, including a first light element having a first color, a second light element having a second color, and a third light element having a third color. The power supply includes a power supply unit, a controllable switch coupled in series to the third light element in parallel to the second light element. The power supply unit has a first and a second output such that the first light element is coupled to the first output and the second and third light elements are coupled to the second output. The power supply unit provides adjustable output signals at the first and said second output such that the third light element radiates light when the switch is closed.

20 Claims, 3 Drawing Sheets

POWER SUPPLY DEVICE FOR LIGHT ELEMENTS AND METHOD FOR SUPPLYING POWER TO LIGHT ELEMENTS

This application is a national stage application under 35 U.S.C. §371 of International Application No. PCT/IB07/53822 filed on Sep. 20, 2007, which claims priority to European Application No. 06121866.5, filed on Oct. 6, 2006, incorporated herein by reference.

The present invention relates to a power supply device for light elements comprising a power supply unit, a first light element having a first color, preferably white, a second and a third light element having second and third colors, preferably for tuning the color of the first light element, and a controllable switch coupled to said third light element. The invention also relates to a method for power supplying the light elements, preferably having different colors.

A power supply device as mentioned above is for example known from US 2003/0112229 A1. This document describes a driver for color light emitting diodes (LED). The driver comprises a series connection of a first LED and a switch and a second series connection of two LEDs, wherein both series connections are connected in parallel. Further, the driver comprises a third LED which is arranged between the input and output line of the circuit. Finally, an inductance is provided in series to the two afore-mentioned series connections so that the inductance and both series connections are provided parallel to the third LED.

One of the disadvantages of this type of circuit is that the first and second LEDs cannot radiate light statically if the switch is open. The first and the second LED may not be operated independently of each other so that the color gamut achievable by mixing the colors of the first and the second LED is limited.

Generally, light elements in form of light emitting diodes (LEDs) gain more and more importance in a variety of fields where lighting functions are required. Since LEDs are available in different colors, particularly in red, blue and green, it is possible to achieve every color in the color triangle formed by the primary color and thus cover a certain portion of the total color gamut by a mixing operation. For setting the desired light contribution from each of the primary colors, e.g. red, blue and green, a particular driver circuit or power supply is necessary.

Further, LED circuits are especially suited for applications where a base color (for example white) has to be tuned in certain directions (cold, warm). It is expected that a big part of the LED lighting market will be in white lamps with limited color features.

Known driver circuits use different power supply units or current sources for each LED, so that it is possible to supply the desired power to the respective LED for achieving the necessary brightness.

However, the provision of plural power supplies is cost-intensive.

For efficiency reasons, so-called switched mode power supplies (SMPS) are widely used for driving LEDs. Usually all LEDs are connected to some driver means (that is switches) which allow control of the current flow through the individual LEDs. As a result, each LED requires its own switch. In addition, there has to be the possibility to control the current for each LED (that is to fix it at a nominal value or to set it to a certain value which might be time-variable).

In view of the above it is also desirable to provide a power supply device and driver circuit having a reduced number of switches for controlling at least three LEDs necessary to achieve a predetermined color with the LEDs.

Therefore it is an object of the present invention to provide a power supply device for light elements as mentioned above which has a minimal number of switches without having any restrictions concerning the achievable color gamut.

This object is for example solved by the afore-mentioned power supply device, in which said power supply unit has a first and a second output, said first light element being coupled to said first output and said second and third light elements being coupled to said second output, and a controllable switch coupled to said third light element, said power supply unit is adapted to provide adjustable output signals at said first and said second output, and said second and third light elements and said power supply unit are adapted such that said third light element radiates light when the switch is closed. Preferably, the output signals may be adjusted independently. Alternatively, the output signals may be adjusted in a predetermined relation to each other.

According to the present invention, the power supply unit provides two adjustable output signals for controlling at least three different light elements. One of the three light elements may be continuously powered by the first output signal whereas the second and third light elements may be powered by the second output signal. The power of the second output signal may be distributed between the second and the third light element by using a single switch. When the switch is open, the second light element is supplied with the full power of the second output signal. When the switch is closed, the power of the second output signal is partially or fully received by the third light element.

Hence, the inventive power supply device uses only one switch for controlling three light elements. This allows to reduce the overall costs of the power supply device. Further, if the first light element is the one which has the highest contribution to the total light output and thus can be expected to consume the highest amount of power, losses can be reduced since no switch is required. The second and third light elements share one second output of the power supply unit and are controlled by just one switch so that also costs are reduced.

In a preferred embodiment, the second and third light elements are adapted such that only said third light element and not said second light element radiates light when the switch is closed.

That is in other words, the power supplied by the second output of the power supply unit is not divided between the second and third light elements, but is totally supplied to the third light element. This may for example be realized by light elements having different operation voltages, the operation voltage of the third light element being less than the operation voltage of the second light element.

This measure has the advantage that the second and the third light element may be controlled independently by using just one switch. It is moreover possible to mix every color possible with both light elements, so that the overall color gamut achievable with the three light elements is further extended compared to a solution in which the second light element always receives at least a part of the power regardless of the state (switched on or off) of the switch.

In a further preferred embodiment, at least one of said light elements comprises at least one light emitting diode (LED).

The use of LEDs as light elements has the advantage that a variety of applications are possible. Particularly, if the first light element comprises white color LEDs as the dominant light source and the second and third light elements comprises red and blue LEDs, respectively, the user may set the color point of the device from cold white to warm white color. However, the inventive power supply device may also be operated with red, green and blue LEDs, to achieve any color by controlling the three light elements individually.

Moreover, it is to be understood that light elements may comprise one or more light emitting diodes (LED) connected in series or of course organic light emitting diodes (OLED) or a combination thereof. Further, the number of LEDs or OLEDs may be selected independently for each of the light elements, whereas the selection of the number of LEDs in the second light element in relation to the number of LEDs in the third light element might have some impact on the division of the current delivered by the second output of the power supply. Finally, any other combination of LEDs and/or OLEDs in parallel or in series connections may also be used as light elements.

In a preferred embodiment, said power supply comprises a first and a second current source assigned to the first and the second output, respectively.

This measure has the advantage that the control of the second and third light element is improved. It is to be noted that current sinks instead of current sources are also conceivable. Generally, the power supply is adapted to provide controllable currents at said outputs.

In a further preferred embodiment, the output level of said second output is adjusted synchronously to the switch for supplying the second and the third light element with different signals.

This means in other words that the second output supplies a first power level (e.g. a current of a first level) when the switch is closed and a power of a second level (current of a second level) when the switch is open. Hence, the power supply unit is controlled in response to the control of the switch.

This measure has the advantage that the range of control of the second and third light elements may be extended, so that the overall control of the device is improved.

In a further preferred embodiment, said power supply unit comprises two switched mode power supply subunits.

This measure has the advantage that this type of supply unit have been proven advantageous particularly in terms of power consume and power control.

In a further preferred embodiment, at least one optical sensor is provided for measuring the light characteristic, e.g. but not limited to flux, color, peak wavelength, color rendering index of the light elements and for transmitting a control signal to a controller adapted to control the brightness of the light elements. More preferably, a further sensor, namely a temperature sensor, is provided to protect the system from overtemperature and to compensate for changing light characteristics of the light elements at different temperatures.

In a further preferred embodiment, at least one energy storage element is provided and assigned to at least one of said second and third light elements. More preferably a first energy storage element, preferably a capacitor, is provided, preferably parallel to, and assigned to said second light element, a second energy storage element, preferably a capacitor, is provided, preferably parallel to, and assigned to said third light element, and a decoupling element, preferably a diode, is provided and assigned to said first and second energy storage elements. Preferably the decoupling element is provided in series to the parallel connection of said first energy storage element and said second light element This measure has the advantage that the light elements may be energized by the stored energy during periods in which the respective light element does not receive power from the second output of the power supply unit. For example, when the switch is closed, the capacitor parallel to the third light element is charged as to store energy and the capacitor parallel to the second light element is discharged via the light element causing the second light element to radiate light. This mode of operation has the special benefit to lower the RMS-currents in the light elements for a given average current. With today's LED or OLED based light elements, more light output can be produced by a given set of light elements or the number of light elements can be reduced for a given required light output. As a further benefit, the flickering of the light elements is reduced, which is important for the human perception.

It is to be noted that the energy storage elements may comprise capacitors, inductors, other storage elements or any combination thereof The type and position of the decoupling element depends on the selection of the energy storage elements. It is to be noted that the decoupling element may comprise e.g. one or more diodes.

The object of the present invention is also solved by a method for supplying power to light elements, preferably of different colors, preferably for tuning the total light color, comprising the steps:

provide a first light element having a first color and supplying it with a first power, providing a second and third light element, preferably both light elements having different colors, preferably selected to tune the main color, providing a switch in series to the third light element for switching the third light element on and off, wherein said series connection and said second light element are arranged in parallel, supplying said second and third light elements with a second power, wherein said first and second light elements and said second power are selected such that the third light element emits light if the switch is closed and the second light element emits light if said switch is open.

The advantages of this method are the same as already described with reference to the inventive device so that it is refrained from repeating it here.

In a preferred embodiment, said second power is adjusted independently of said first power. However, it is to be noted that said second power may also be dependent on said first power, that is to have a fixed or adjustable relation between said first and second power.

In a preferred embodiment (a static operation mode) the switch is maintained in one switching state and the relation of the power amplitude supplied to the second or third light element to the power amplitude supplied to the first light element is varied to reach the desired total color.

This means that the light output of either the second or the third light element adds to the light output of the first light element and thus the total light output of the device can be tuned between the light characteristics of the first light element and either the second or the third light element In a further preferred embodiment (a dynamic operation mode) the switch is continuously switched on and off with a certain duty cycle to achieve a mixed color light output of the second and third light element.

This means that the total light output of the device depends on the output of the first light element and the mixed outputs of the second and the third light element.

In a preferred embodiment, the relation of the power amplitude supplied to the second or third light element to the power amplitude supplied to the first light element is varied to reach the desired total color of the device and the power amplitudes supplied by the first subunit and the second subunit are varied to reach the desired brightness.

It is further preferred that the power amplitude supplied to the second and third light elements is changed in relation to the duty cycle of the switch. Most preferably, said switch is switched on and off at least 50, preferably 400 times per second and said first light element is supplied with a continuous power signal. Generally, the switching cycle is selected as to be sufficiently high to avoid flickering to the human eye.

In a further preferred embodiment, at least one energy storage element for at least one of said second and third light elements is provided for supplying energy during periods in which no energy is received from a power supply, and the switching cycle of the switch is selected as to be sufficiently high to avoid flickering to the human eye.

Contrary to the embodiment mentioned above, the use of energy storage elements allows to further reduce the switching cycle below 50 Hz without causing flickering since the storage elements supply energy when the switch is open. The minimum switching cycle is determined by the type of energy storage element and its storage capacity.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

Embodiments of the invention are shown in the drawings and will be explained in more detail in the description below with reference to same. In the drawings.

Figure 1:
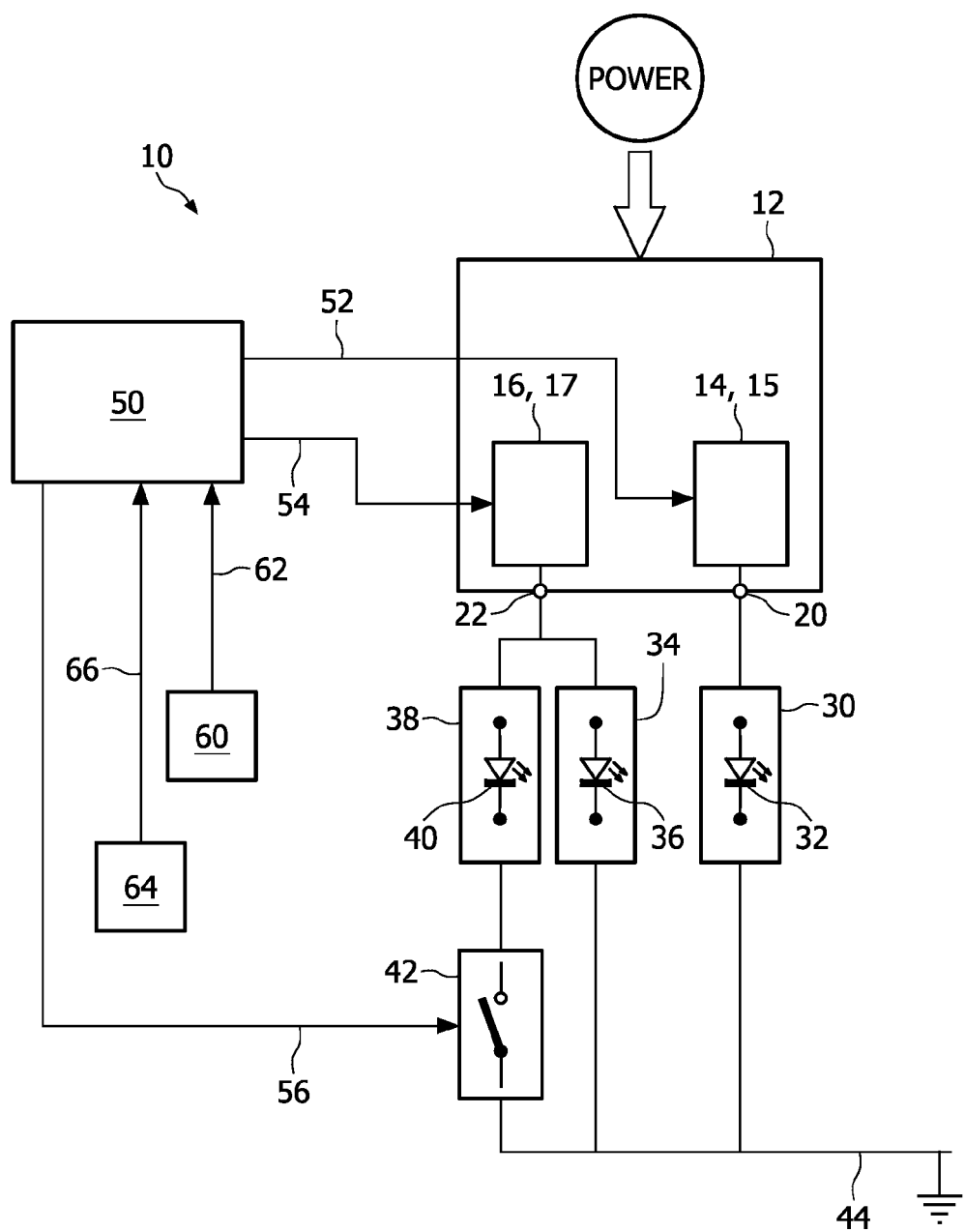
FIG. 1 shows a block diagram of a power supply device according to a first embodiment.

In FIG. 1 a block diagram of a power supply device is shown and indicated with reference numeral 10. Such a power supply device 10 may be used for controlling light elements, like LEDs or OLEDs, etc., individually. This is particularly useful in cases where the light elements have different colors, for example red, green and blue. By controlling the light elements and hence the intensity or brightness of the respective red, green and blue light, it is possible to mix every color of a wide color gamut. In cases, where one light element is dominant and for example radiates white light, the further light elements may be used to tune the color, that is to change the color point, for example between a cold white to a warm white.

The power supply device 10 shown in FIG. 1 comprises a power supply unit 12 which is connected to a power source, like the mains voltage, a battery voltage or any other energy source. The power supply unit 12 comprises a first power supply subunit 14 and a second power supply subunit 16. The first subunit is connected to a first output terminal 20 and the second subunit is connected to a second output terminal 22.

In the present embodiment, both power supply subunits are provided as switched mode power supply units showing the behavior of current sources. This means that the output current provided at the output terminals 20, 22 is only a weak function of the load voltage.

The power supply device 10 further comprises a first light element 30 coupled between the output terminal 20 and ground 44 and second and third light elements 34, 38 coupled between the second output terminal 22 and ground 44. Each light element 30, 34, 38 comprises at least one light emitting diode 32, 36, 40, which may be of different colors. For example, the LED 32 of the first light element 30 is a white LED, whereas the second light element 34 comprises a blue LED 36 and the third light element 38 comprises a red LED 40.

In the context of the present application, LED does not only mean one single light emitting diode, but may also mean a string connection or parallel connection or mixed string and parallel connection of LEDs or organic light emitting diodes (OLEDs). Just for simplicity reasons, only one LED is shown for each light element.

The power supply device 10 further comprises a switch 42 which is connected between the third light element 38 and ground 44. The switch is controllable by means of a control signal. Hence, it is preferred to use a semiconductor switch, like a transistor, field effect transistor, etc. However, other types of switches are also conceivable. The series connection of the third light element 38 and the switch 42 is coupled parallel to the second light element 34.

The control signal 56 for controlling the switch 42 is generated by a controller 50. The controller 50 may be provided as an ASIC or any other semiconductor IC or a combination of different integrated circuits or a combination of discrete components or a combination of several of the aforementioned.

As it is shown in FIG. 1, the controller 50 also generates control signals for the first power supply subunit 14 and the second power supply subunit 16 transmitted via control lines 52 and 54, respectively. The control signals are used to adjust the power supplied to the respective output terminals 20, 22. Particularly, the current supplied to the terminals 20, 22 and hence to the light elements 30, 34, 38 is adjusted. For those skilled in art, it is obvious that it is possible to use a different number of control lines for transmitting the two control signals to the power supply subunits and the control signal to the switch, e.g. share one line to transmit more than one signal or use a transmission method which uses more the two lines for two signals, e.g. two lines for each signal.

The power supply device 10 further comprises an optical sensor 60 which generates a signal supplied to the controller 50 via a line 62 on the basis of the light incident on the sensor. In addition to the optical sensor 60, a temperature sensor 64 is also provided and electrically coupled with the controller 50 via line 66. The temperature sensor 64 is provided for measuring the temperature of the device and to generate a respective signal which is validated by the controller 50.

The power supply device 10 functions as follows:

Both power supply subunits 14, 16 supply a current to the loads, namely the light elements, connected between the respective terminals 20, 22 and ground 44. The level of the current is adjusted by the controller 50 which generates respective control signals transmitted to the subunits. The control signals determining the amplitude of the current are either set manually by the user or automatically on the basis of given information or sensor signals.

The first power supply subunit 14 supplies a continuous current flowing through the light element 30. As a result, the light element, here the light emitting diode, radiates light. The intensity of the radiated light (brightness) may be controlled by adjusting the amplitude of the current supplied by the subunit 14.

The second subunit 16 also provides a current to the load, however, this current is divided between the second light element 34 and the third light element 38 dependent on the switch status. If the switch 42 is open, the whole current flows through the second light element 34 so that the third light element 38 does not radiate light.

When the switch 42 is closed, the current is divided between both light elements 34, 38 so that both light elements radiate light. The intensity of the radiated light depends on the respective current flowing through the elements.

In a preferred embodiment, the light elements 34, 38 are selected such that the current solely flows through the third light element 38 when the switch 42 is closed. This characteristic may be realized by implementing the light element 38 with a lower operation voltage than the second light element 34. In this case, the whole current flows through the third light element 38 when the switch is closed due to the fact that the operation voltage across the third light element 38 is lower than the operation voltage necessary for activating the second light element 34. However, beside the operation voltage also the typical characteristic of the light elements, namely the diode characteristic has to be considered when selecting the respective light elements 34, 38.

A person skilled in the art knows how to set the operation voltage of light elements so that it is not necessary to describe all possibilities here. One possibility for achieving this technical effect is to use more LEDs connected in series for the second light element 34 as for the third light element 38. However, the LED material has also influence on the operation voltage.

Hence the intensity of the second and third light elements 34, 38 may be adjusted by switching the switch 42 on and off according to a predetermined duty cycle. Further, the intensity of the second and third light elements may be adjusted by the selected amplitude of the current supplied by the second subunit 16.

If the second and third light elements have different colors, for example blue and red, the tune color provided by the second and third light element can be selected by controlling the switch. By controlling the amplitude of the current supplied by the subunit 16, the tune intensity can be selected. Together with the dominant color of the first light element, the color point as well as the total intensity can be controlled.

In a further preferred operation mode, the current amplitude of the second subunit 16 is varied between two values dependent on the switch state. That is, the current amplitude has a first value when the switch is closed and a second value when the switch is open. This improves the adjustability of the device, namely the intensity range of the second and the third light elements.

With respect to the CIE chromaticity diagram shown in FIG. 3 a first static operation mode of the power supply device will be described. It is assumed that the first light element is neutral white (base color) and the second and third light elements are amber and cyan, respectively. Further, the switch 42 is either on or off, and hence is not continuously switched on and off.

The second and third light elements are used as tune colors (C and A), which are on different sides of the base color. The mixed color generated by all light elements may be tuned in two directions which are indicated as arrows in FIG. 3. To create the output color point CP1 or CP2, only one tune color C or A is used at the same time, so that the switch is either open or closed. The tuning is done only by varying the amplitude of the tune power which is supplied by the second subunit 16 in relation to the power supplied to the first light element by the first subunit 14.

When the user changes the desired color point from one side to the other side of the base color, the switch is operated once, but there is no pulse width modulation (PWM) signal supplied to the switch.

Figure 4:
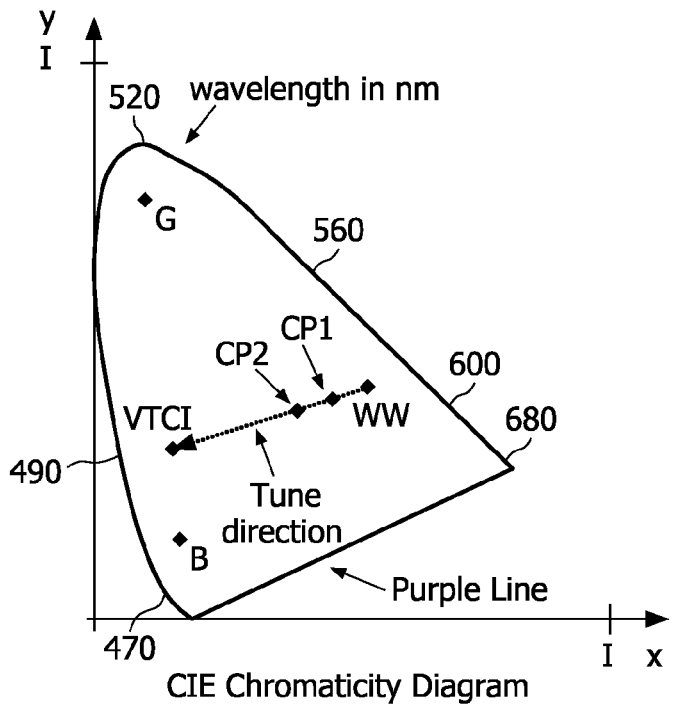
FIG. 4 is a CIE chromaticity diagram illustrating the tune colors generated with the inventive power supply device in a second operation mode.

With respect to FIG. 4 showing a further CIE chromaticity diagram, a second dynamic operation mode will be described. In this embodiment it is assumed that the base color (first light element) is warm white (WW), and the second and third light elements are blue (B) and green (G), respectively. Further, it is assumed that the second and third light elements are adapted such that the complete power of the second subunit 16 is delivered to the third light element when the switch 42 is closed.

Both tune colors B and G are on the same side of the base color WW. To reach a certain output color point CP1 or CP2, the tuning has to be done into the direction of the virtual tune color VTC1. To create this virtual tune color, both tune colors B, G have to be used by means of a pulse width modulation. That is, the switch 42 is continuously switched on and off with a fixed duty cycle. As long as the tune direction is kept, only the amplitude of the tune current has to be changed to reach either CP1 or CP2. The duty cycle can be maintained at a constant value.

Generally, the switch 42 is operated with an PWM. The duty cycle may depend on the user input, but it is also possible to keep it at a fixed value.

Figure 3:
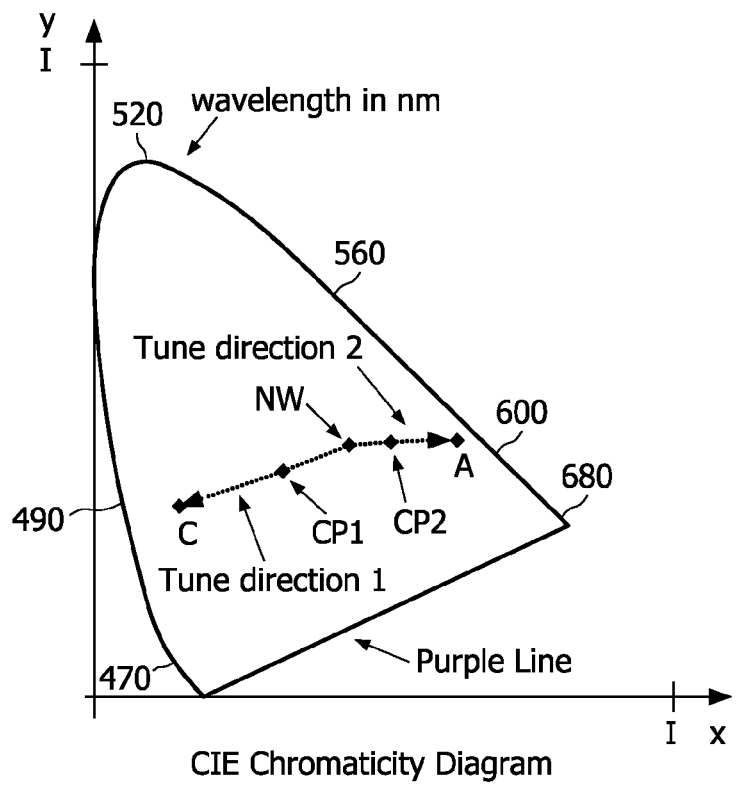
FIG. 3 is a CIE chromaticity diagram illustrating the tune colors generated with the inventive power supply device in a first operation mode.

Beside the examples presented in FIG. 3 and FIG. 4 other selections of the colors and other usage of the invented power supply device and the method to operate it are possible.

With the described power supply device, it is possible to use both tune colors of the second and third light elements virtually at the same time. This is possible due to the slow response of the human eye that will average the light contributions of both tune colors. When the switch 42 is repetitively closed and opened at a rate of at least 50 times per second, preferably more than approximately 400 times per second, both light elements 34, 38 produce virtually together the tune color. It might be possible to reduce the switching frequency without visible color flicker because of the presence of the continuously driven dominant color first light element 30.

To sum up, the tune color control provided by the power supply device 10 can be done in several ways:

Firstly, the switch 42 is either open or closed for a given operation point. This mode is especially useful with color points of the second and third light element being located on opposite sides of the first light element when looking at their color points in a color space, e.g. an amber and a cyan LED as second and third light element, respectively, and a white LED as first light element. In case the device has to produce a color being "warmer" than the white from the first light element, the switch is set to activate the amber LED. The relation of the power delivered from the first power subunit 14 with respect to the power delivered from the second subunit 16 determines the total color point, being located between the white from the first light element and the amber from the second light element. Tuning into "colder" color requires to set the switch 42 as to activate the third light element 38, i.e. the cyan LED. Again, the ratio of the power delivered from the first power subunit 14 and the power delivered from the second subunit 16 determines the resulting color point, now being located between the white from the first light element and the cyan from the third light element. Of course, other color selections are also possible. In this operation mode, the state of the switch is stable, as long as a stable output color is selected. There is no duty cycle applied to the switch.

Secondly, the duty cycle of the switch 42 is fixed. Thereby, adjusting this duty cycle creates a new, virtual tune color. The influence (intensity) of the tune color is determined by the amplitude. This method does not change the duty cycle of the switch according to the color point set by the user.

Thirdly, if the power supply subunit 60 can be controlled fast enough to change synchronously to the switching cycle, it is also possible setting different tune currents for the two time intervals. This method does not change the duty cycle of the switch according to the color point set by the user.

Lastly, the duty cycle of the switch 42 is changed to produce more or less contribution of each tune color. This method results in having the duty cycle of the switch related to the color point set by the user.

For all operation modes, it is not required to have the color points of the three light elements arranged as described, however, a skilled person will notice, that the arrangement of the color point has influence on the possible mix colors.

To improve the operation, the temperature sensor may be used to protect the system from overtemperature and to compensate for changing light characteristics of the light elements at different temperatures.

The optical sensor 60 (for example flux sensors, filtered photodiodes, color sensors, etc.) can be used to directly measure the light characteristics and correct the control signals supplied to the first and second power supply subunits 14, 16.

Figure 2:
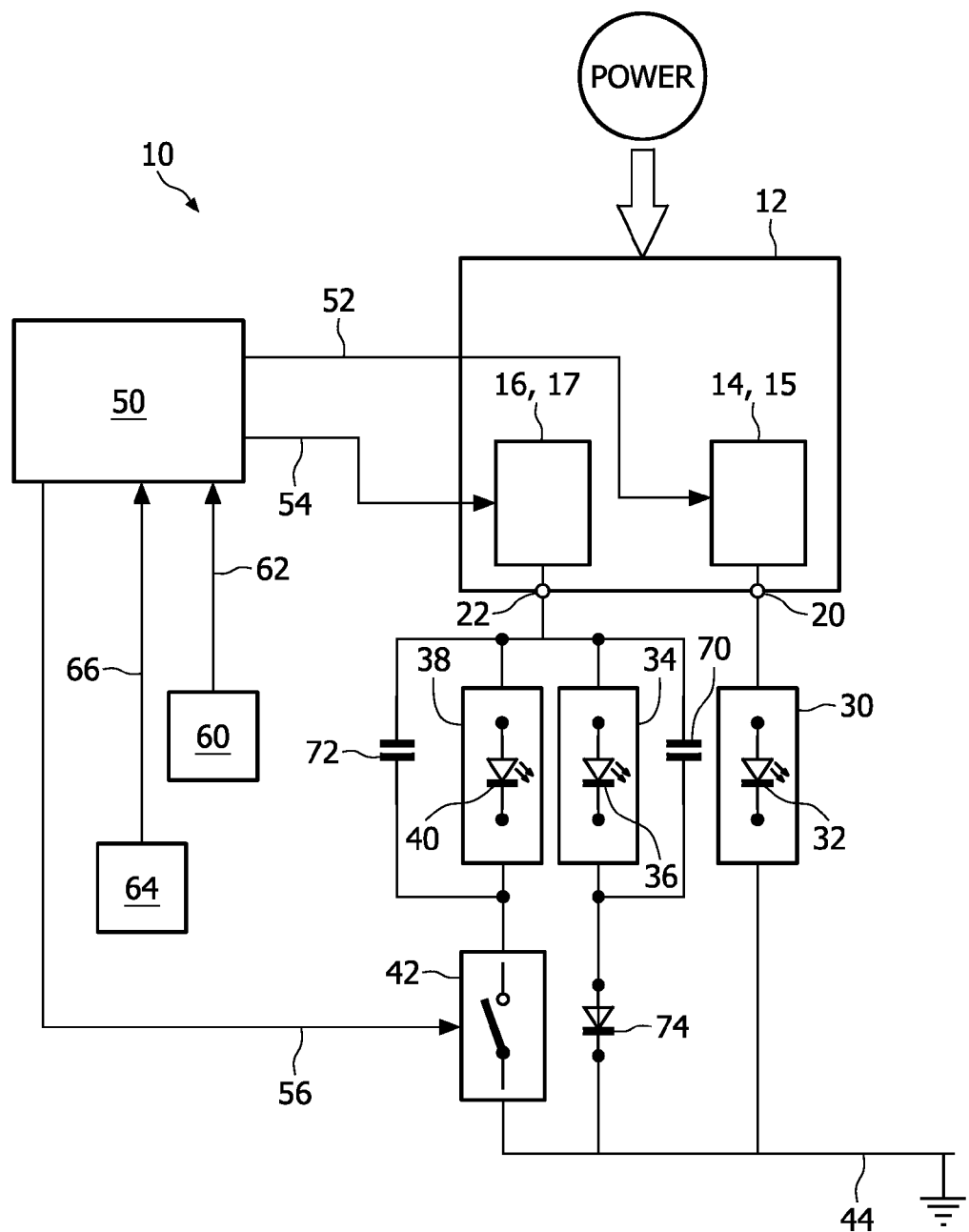
FIG. 2 shows a block diagram of a power supply device according to a second embodiment.

In FIG. 2, a power supply device 10 according to a second embodiment is shown. Since the structure is substantially similar to that of FIG. 1, it is refrained from describing the elements indicated with the same reference numerals as in FIG. 1.

The difference of the power supply device 10 according to FIG. 2 is that two capacitors 70, 72 serving as energy storing elements are provided parallel to the second light element 34 and the third light element 38, respectively. Further, a diode 74 is connected in series with the capacitor 70.

Both capacitors 70, 72 serve to provide energy to the light element during those time periods in which the light elements are not supplied by the second subunit 16.

For example, if the switch 42 is closed, the capacitor 72 is charged. When the switch 42 is opened, the stored energy in the capacitor 72 flows through the third light element 38 so that it may radiate light. The same happens for the second light element 34. The diode 74 is provided to prevent that one capacitor discharges to the other capacitor.

Further modifications and variations of the embodiments described above are conceivable without departing the scope of the present invention as defined in the claims. For example, the subunit 16 may be further adapted to detect the voltage at output terminal 22 and to select and set in response thereto one of a plurality of stored settings.

To sum up, the present invention allows to implement a driver topology for LED-lamps having a dominant color (e.g. warm white) which is being modified via two additional colors (e.g. blue and green) in order to modify the color point (e.g. from warm white to cold white). This dominant color is white produced by phosphor converted LEDs with high color rendering and stable color point that is dimmed by changing the amplitude of the driver current through these LEDs. Advantageously, the dominant color is driven in a more efficient way compared to pulse wide modulation driving, which leads to overall efficiency increase of the device. On the other hand for the dominant color no additional switch is required. The other LEDs for color point variation share one second output of the power supply and are controlled by just one switch. Again, costs are reduced. Since the current level as well as the current path of the LEDs sharing one output can be controlled independently, it is easier to adjust their light output. It is important to note that it is possible to set the desired color without PWM switching of the LEDs, so the light output is continuous over time.

The invention claimed is:

1. Power supply device for light elements, comprising
a power supply unit,
a first light element having a first color,
a second and a third light element having second and third colors, and
a controllable switch coupled in series to said third light element, wherein said series connection of said third light element and said switch is arranged in parallel to said second light element, wherein
said power supply unit has a first and a second output, said first light element is coupled to said first output and said second and third light elements—are coupled to said second output,
said power supply unit is adapted to provide adjustable output signals at said first and said second output, and
said second and third light elements and said power supply unit are adapted such that said third light element radiates light when the switch is closed.

2. Power supply device of claim 1, wherein said power supply unit is adapted to provide independently adjustable output signals at said first and said second output.

3. Power supply device of claim 1, wherein said power supply unit is adapted to provide output signals at said first and said second output which are adjustable in a predetermined relation to each other.

4. Power supply device of claim 1, wherein said second and third light elements are adapted such that only said third light element and not said second light element radiates light when the switch is closed.

5. Power supply device of claim 1, wherein at least one of said light elements comprises at least one light emitting diode.

6. Power supply device of claim 1, wherein said power supply comprises a first and a second current source assigned to the first and the second output, respectively.

7. Power supply device of claim 1, wherein the output level of said second output is adjusted synchronously to the switch for supplying the second and the third light element with different signals.

8. Power supply device of claim 1, wherein said power supply unit comprises two switched mode power supply subunits.

9. Power supply device of claim 1, further comprising at least one optical sensor for measuring the light characteristics of the light elements and for transmitting a control signal to a controller adapted to control the power supplied to light elements.

10. Power supply device of claim 1, further comprising a temperature sensor to protect the system against over-temperature and to compensate for light variations of the light elements at different temperatures.

11. Power supply device of claim 1, further comprising at least one energy storage element assigned to at least one of said second and third light elements.

12. Power supply device of claim 1, further comprising
a first energy storage element assigned to said second light element,
a second energy storage element assigned to said third light element, and
a decoupling element assigned to said first or said second energy storage element.

13. Power supply device of claim 11, wherein at least one of said energy storage elements is a capacitor.

14. Method for supplying power to light elements, of different colors, comprising the steps:
  providing a first light element having a first color and supplying it with a first power,
  providing a second and third light element in parallel, both light elements having different colors, and selected to cover a certain color gamut together with the first light element,
  providing a switch in series to the third light element for switching the third light element on and off, wherein said series connection and said second light element are arranged in parallel,
  supplying said second and third light elements with a second power, wherein said first and second light elements and said second power are selected such that the third light element emits light if the switch is closed and the second light element emits light if said switch is open.

15. Method of claim 14, wherein in a static operation mode the switch is maintained in one switching state and the relation of the power amplitude supplied to the second or third light element to the power amplitude supplied to the light element is varied to reach the desired total color.

16. Method of claim 14, wherein in a dynamic operation mode the switch is continuously switched on and off with a certain duty cycle to achieve a mixed color for tuning the total color.

17. Method of claim 16, wherein the power amplitude supplied to the second and third light elements is changed in relation to the switching state of the switch.

18. Method of claim 16, wherein said switch is switched on and off at least 50 times per second.

19. Method of claim 14, wherein the relation of the power amplitude supplied to the second or third light element to the power amplitude supplied to the first light element is varied to reach the desired total color and the power amplitudes supplied by the first subunit and the second subunit are varied to reach the desired brightness.

20. Method of claim 14, further comprising providing at least one energy storage elements for at least one of said second and third light elements for supplying energy during periods in which no energy is received from a power supply, and the switching cycle of the switch is selected as to be sufficiently high to avoid flickering to the human eye.

* * * * *